Aug. 23, 1938.  L. A. ECKERMANN  2,127,587

CAR LOADING DEVICE

Filed Nov. 15, 1935  2 Sheets-Sheet 1

INVENTOR.

Leo A. Eckermann.

BY

Harness, Dickey, Pierce & Hann
ATTORNEYS.

Aug. 23, 1938.  L. A. ECKERMANN  2,127,587
CAR LOADING DEVICE
Filed Nov. 15, 1935   2 Sheets-Sheet 2
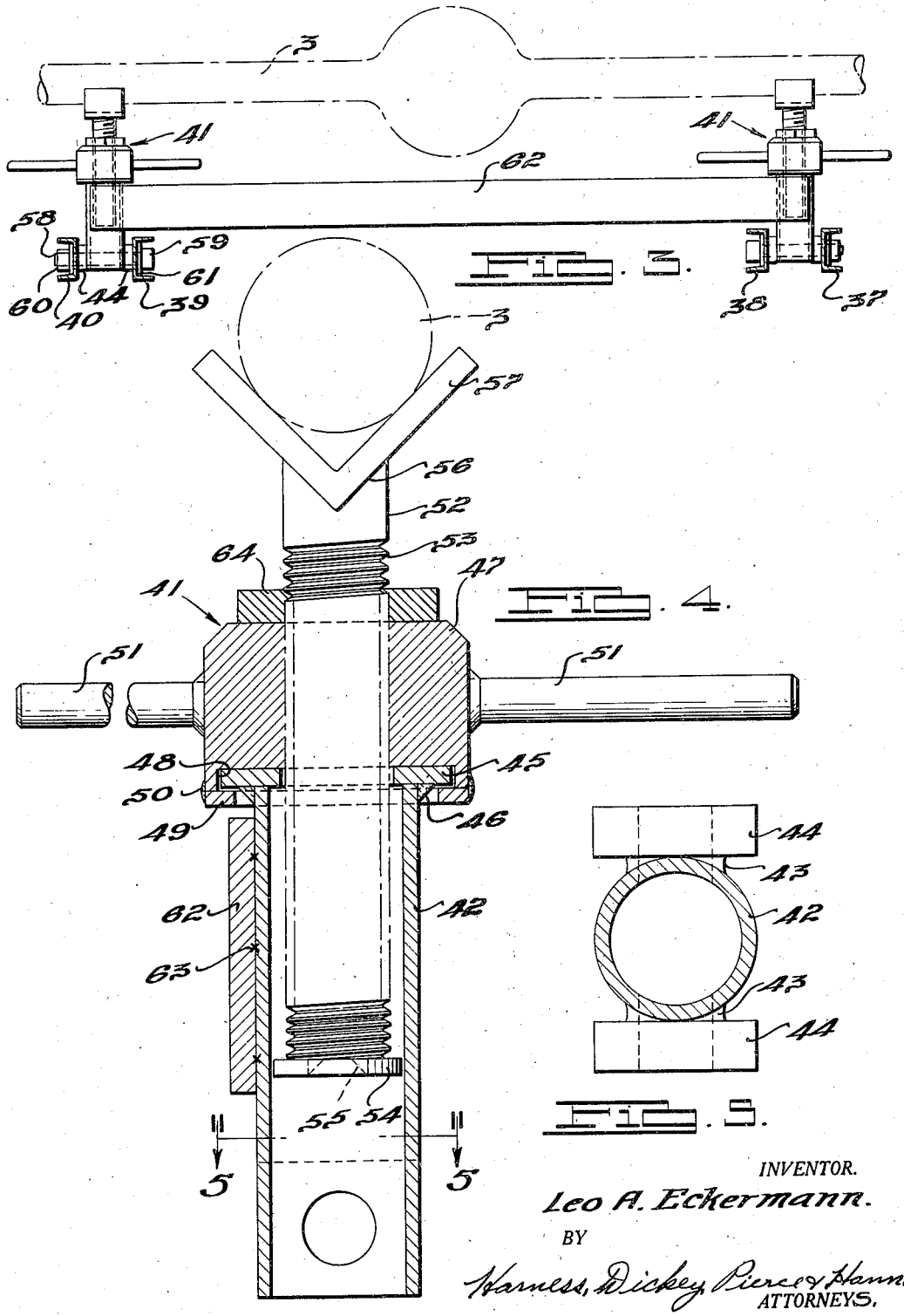
INVENTOR.
Leo A. Eckermann.
BY
Harness, Dickey, Pierce & Hann.
ATTORNEYS.

Patented Aug. 23, 1938

2,127,587

UNITED STATES PATENT OFFICE 2,127,587

CAR LOADING DEVICE

Leo A. Eckermann, Detroit, Mich., assignor, by mesne assignments, to The Worth Company, a corporation of Michigan Application November 15, 1935, Serial No. 49,873

15 Claims. (Cl. 105—368)

The invention relates to car loading devices and constitutes an improvement over the type of car loading device disclosed in the co-pending application of Samuel D. Butterworth, Serial No. 646,830, filed December 12, 1932.

In the aforementioned Butterworth application, an automobile is adapted to be supported by its wheels on a frame which is adapted to assume an elevated, inclined position. It has been found that in certain cases the inclination of the automobile places an unusually heavy load upon the bearings of the wheels at the lower end of the automobile, and this fact combined with the severe jolting movement of the car has in some instances caused injury to such bearings. Accordingly, it is one of the objects of this invention to provide a means mounted at the lower end of the loading frame for engaging the rear or lower axle of the automobile and supporting that end of the automobile thereby.

Another object of the invention is to provide a means adapted to engage and support a vehicle by means of its axle, which means may be swung into an inoperative position substantially within the confines of the frame in order to permit movement of the entire frame into close proximity with the roof of the freight car.

Another object of the invention is to provide a means at one end of the loading frame for elevating the corresponding end of an automobile positioned thereon independently of the frame.

A further object is to provide a device of this character which is simple, rugged, and easy to operate.

Other objects and advantages of the invention will appear from the following specification and the claims hereinafter set forth.

For a better understanding of the invention, reference may be had to the accompanying drawings forming a part of the specification, wherein:

Fig. 3 is a transverse elevation of the jack assembly, partly in section, taken along the line 3—3 of Fig. 2;

Fig. 4 is an axial section of one of the jack mechanisms; and

Fig. 5 is a sectional view perpendicular to the axis of the jack barrel, taken on the line 5—5 of Fig. 4.

Figure 1:
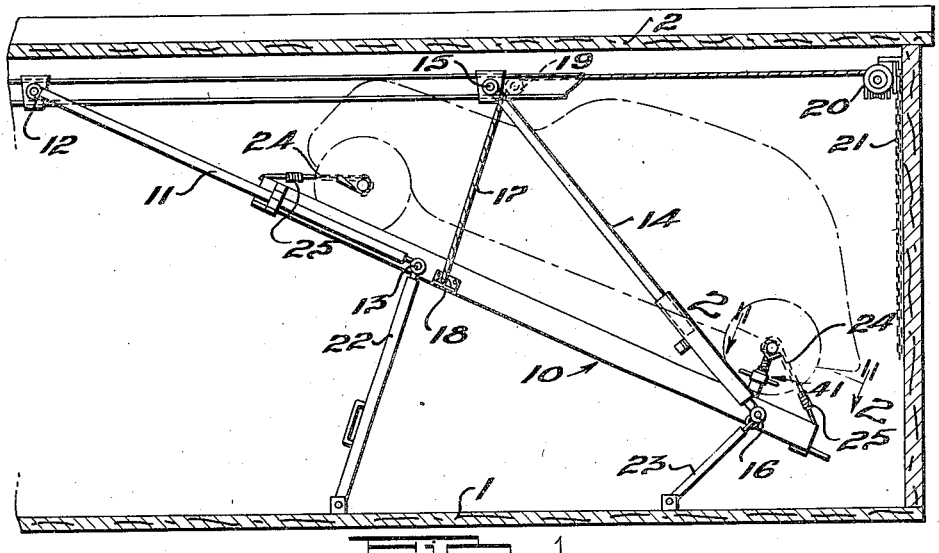
Figure 1 is a longitudinal, sectional view of one end of a freight car illustrating the car loading mechanism in its loaded condition.

Referring to Fig. 1, a frame indicated generally at 10 is provided for supporting an automobile during shipment in a freight car having a floor 1 and a roof 2. This frame is mounted for swinging movement in the freight car by means of a pair of solid rods 11 pivotally connected at 12 adjacent the roof of the car, and at 13 to the forward end of the frame, and a pair of telescoping rods 14 pivoted to the car adjacent the roof thereof at 15 and to the lower end of the frame at 16. By means of these connecting rods the frame may be swung into a position upon the floor of the car for loading and unloading purposes.

A pair of cables 17 are connected respectively at opposite sides of the frame 10, as indicated at 18, and extend over fixed pulleys 19 to drums 20. The drums form parts of a hoist mechanism which may be operated by chain 21 to wind the cables on the drums and thus elevate the loading frame to the position shown in Fig. 1. At this time suitable thrust members 22 and 23 may be placed in position between the floor 1 of the freight car and the pivots 13 and 16, respectively, of the loading frame. The automobile may be secured in place upon frame 10 by any suitable means such as chains 24 connected to the frame and the axles of the vehicle. The chains are provided with coiled springs 25 adapted to permit a limited longitudinal movement of the automobile relative to the frame to cushion the frame against shocks.

When it is desired to use the freight car for other purposes than loading automobiles, the loading frame may be swung into a position parallel with and in close proximity to the roof 2 of the car. This is accomplished by winding additional lengths of cables 17 on drums 20. During this further elevating movement of the frame, telescoping rods 14 will be reduced in length, the telescoping portion being provided for this purpose.

Figure 2:
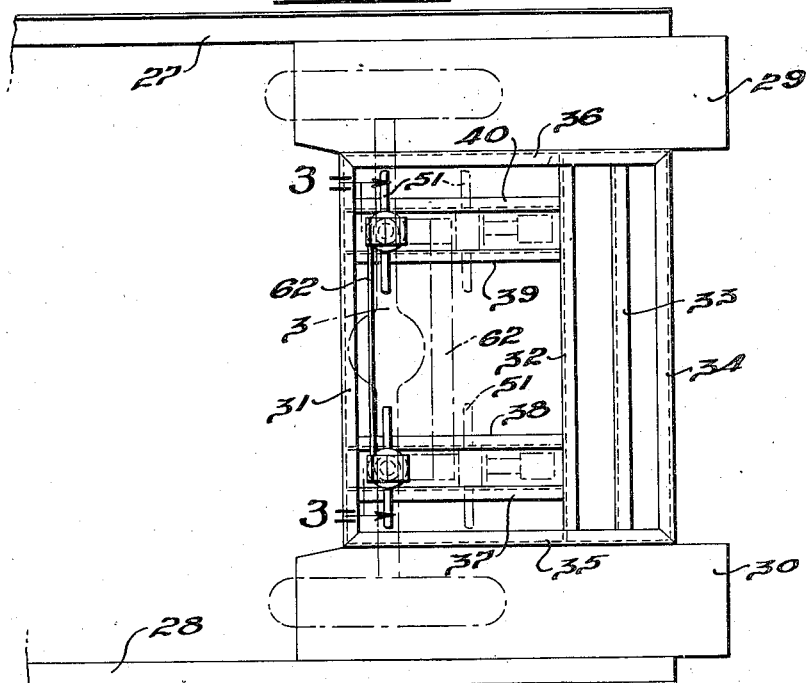
Fig. 2 is a partial plan view, taken on the line 2—2 of Fig. 1.

Referring particularly to Fig. 2, the frame 10 comprises longitudinal side frame members 27 and 28 of angle section, and carries integrally secured thereto wheel-supporting plates 29 and 30 for supporting the rear wheels of the vehicle positioned on the frame. Similar plates, not shown, are mounted at the forward end of the frame and are adapted to receive and support the front wheels of the vehicle. An end frame structure shown in Fig. 2 is integrally secured to and forms a permanent part of the main frame 10, and includes transverse channel frame members 31, 32, 33 and 34, and longitudinal channel members 35 and 36 which extend along the inner edges of supporting plates 30 and 29 respectively. Integrally connected to and between transverse frame members 31 and 32 are two pairs of longitudinal frame channel members 37, 38, and 39, 40. The frame members constituting this end structure are secured together permanently by any suitable means, such as welding.

In order to relieve the rear wheel bearings of the load, there is provided a pair of jack members indicated generally at 41 which are pivotally connected to the rear frame structure and are adapted to engage and elevate the rear axle of the automobile. As best shown in Figs. 3 and 4, each of the jacks comprises a barrel 42 having welded thereto, as at 43 in Fig. 5, a pair of bearing bosses 44. The barrel 42 which is cylindrical in form, has welded to the upper end thereof an annular wear plate 45, the welded joint being indicated at 46. The annular wear plate 45 has a central circular opening therethrough of slightly smaller diameter than the internal diameter of the barrel 42, and it has an outside diameter substantially greater than the outside diameter of the barrel. A jack head 47, which is provided with a circular recess 48 for the reception of wear plate 45, is positioned as shown in Fig. 4 upon the wear plate with the downwardly extending flanges or sides of the recess 48 extending below the lower surface of the wear plate. An annular retaining ring 49 is welded, as at 50, to the bottom face of the wall of recess 48 and serves to prevent axial displacement of the head with respect to the barrel of the jack.

The head 47 is provided with a pair of handles 51 which are integrally secured thereto as by welding, and the head is axially bored and the bore provided with screw threads for the reception of the jack stem 52 having corresponding threads 53. An annular retaining ring 54 is welded, as indicated at 55, to the lower end of the jack stem. This ring 54 is substantially equal in outside diameter to the inside diameter of the barrel and thus serves as a guide means for the stem and also prevents, by engagement with ring 45, complete withdrawal of the stem from the barrel. The upper end of stem 52 is notched as at 56 for the reception of a V-shaped axle engaging member 57 which is welded thereto; and a lock nut 64 is provided for locking the stem in any adjusted position.

One of the two jacks is pivotally supported by and between channel members 39 and 40 by means of a shaft 58 which passes through the channel members, the bearing bosses 44 and the barrel 42 to provide a journal for the jack. This shaft is made in the form of an ordinary bolt having a head 59 at one end and which is threaded at the opposite end for the reception of a nut 60. Suitable washers are provided between the nut and head and the adjacent channel member, as shown at 61. The other jack is similarly mounted between channel members 37 and 38 on a shaft which is axially aligned with shaft 58. The two jacks are integrally connected by a bar 62, which is welded at its ends respectively to the two jack barrels, as indicated at 63 in Fig. 4.

By means of the structure just described the two jacks may be swung as a unit from the position shown in Fig. 3, where they can engage and elevate the axle 3 to a position wherein both jacks lie substantially parallel with the frame and between their respective supporting channels 37, 38 and 39, 40. To permit the entrance of the jack head between its supporting channel members, the space between these channels is made slightly greater than the outside diameter of the head 47. As a result, when the jack assembly is folded into inoperative position, a major portion of each jack lies between its respective supporting channels. The handles 51 normally rest upon the top edges of the channels, as shown in dotted lines in Fig. 2, and prevent further downward swinging movement of the jack assembly. In any event, the connecting bar 62 would prevent the jack from swinging below the plane of the frame inasmuch as it will engage the top edges of channel members 37 and 38, as shown in Fig. 2.

When the jack assembly is swung into its inoperative position it lies substantially flush with the top surface of the loading frame with the result that it will not interfere with elevation of the frame into close proximity to the roof when it is desired to use the car for other purposes than loading automobiles. However, the two jacks as a unit are readily swung into operative position wherein they lie substantially perpendicular to the plane of the frame. In this position, of course, the handle 51 may be utilized to rotate the jack head and elevate the screw 52 for the purpose of raising the automobile off its wheels. When the desired elevation is achieved, the lock nut 64 is tightened against head 47 to lock the parts in position.

It is apparent from the above description and the accompanying drawings that a simple, rugged and readily operated jack assembly has been provided for the purposes specified. The attachment may be used at both ends of the frame, in order to protect the wheel bearings of all four wheels from injury, but the need for such an attachment is greater at the lower end of the frame because of its inclination. It will be noted that the pivotal mounting of the jacks combined with chain springs 25 permits a limited longitudinal movement of the automobile with respect to the frame to cushion the latter against longitudinal shocks. The attachment is of considerable value for the purpose of relieving the rear wheel bearings of the excessive load and severe jolting which may result from the normal use of the loading frame. In addition, it may be found of advantage merely as a means to elevate one end of the automobile above the loading frame in order to provide room beneath the car for a vehicle positioned on the floor. This advantage arises from the fact that the forward end of a car positioned on the floor may extend between the longitudinal frame members 27 and 28 and above the level of the frame itself. In such cases, the automobile positioned on the floor may be moved closer to the end of the car if the automobile on the frame is elevated somewhat at its lower end. Under some circumstances this will permit the loading of additional automobiles in the freight car.

Although only one form of the invention has been illustrated and described in detail, it will be appreciated by those skilled in the art that various modifications may be made without departing from the scope of the appended claims.

I claim:

1. In combination with a freight conveyance having a freight compartment therein, an automobile loading frame in said compartment, means connecting said frame to said freight conveyance for movement into an inclined semi-decking position with an automobile supported thereon and into an inoperative position in proximity with and substantially parallel to the ceiling of said compartment, means adjacent the upper end of the frame for supporting one end of an automobile positioned on the frame, means pivotally connected to the frame adjacent the lower end thereof and operative in one position to engage a non-rotatable portion of the opposite end of the automobile and support that end of the automobile independently of its wheels or other rotatable parts, said pivotal means being swingable into an inoperative position adjacent the plane of the frame to permit said frame to move into proximity to the ceiling, and means for preventing displacement of said automobile from said frame.

2. In combination with a freight conveyance having a freight compartment therein, an automobile loading frame in said compartment, means connecting said frame to said freight conveyance for movement into an inclined semi-decking position with an automobile supported thereon and into an inoperative position in proximity with and substantially parallel to the ceiling of said compartment, means adjacent the upper end of the frame for supporting one end of an automobile positioned on the frame, said frame having a pair of spaced longitudinal frame members, a pair of supporting members pivotally connected to the frame between the longitudinal members and adjacent the lower end thereof adapted in one position to engage a non-rotatable part of the axle assembly at the opposite end of the automobile and to support that end of the automobile independently of its adjacent wheels or other rotatable part, said members being swingable into an inoperative position substantially within the confines of the longitudinal frame members to permit said frame to move into proximity to the ceiling, and means for preventing displacement of said automobile from said frame.

3. In a loading device, an automobile supporting frame, means pivotally connected to the frame adjacent one end thereof for engaging a non-rotatable portion of an automobile supported on said frame and supporting the adjacent end of said automobile in elevated position with respect to said frame, said means being capable of pivotal movements while supporting the automobile during normal use of the loading device, the axis of said pivotal connection extending transversely of the automobile, and resilient means for preventing permanent longitudinal displacement of said automobile relative to said frame.

4. In a loading device, an automobile supporting frame, means for supporting said frame in an elevated inclined position with an automobile thereon, means pivotally connected to the frame adjacent the lower end thereof for engaging a non-rotatable portion of the adjacent end of the automobile supported on said frame and supporting that end of the automobile in elevated position with respect to said frame, the axis of said pivotal connection extending transversely of the automobile, and resilient means for preventing permanent longitudinal displacement of said automobile relative to said frame incident to pivotal movements of said pivotal connecting means.

5. In combination with a freight conveyance having a freight compartment therein, an automobile loading frame in said compartment, means connecting said frame to said freight conveyance for movement into an elevated decking position with an automobile supported thereon and into an inoperative position in proximity with and substantially parallel to the ceiling of said compartment, means adjacent one end of the frame for supporting one end of an automobile positioned on the frame, means pivotally connected to the frame adjacent the other end thereof and operative in one position to engage a non-rotatable portion of the opposite end of the automobile and support that end of the automobile independent of its wheels or other rotatable parts, said pivotal means being swingable into an inoperative position adjacent the plane of the frame to permit said frame to move into proximity to the ceiling, and means for preventing displacement of said automobile from said frame.

6. In combination with a freight conveyance having a freight compartment therein, an automobile loading frame in said compartment, means connecting said frame to said freight conveyance for movement into an elevated decking position with an automobile supported thereon and into an inoperative position in proximity with the ceiling of said compartment, means adjacent one end of the frame for supporting one end of an automobile positioned on the frame, means pivotally connected to the frame adjacent the other end thereof and operative in one position to engage a non-rotatable portion of the opposite end of the automobile and support that end of the automobile independent of its wheels or other rotatable parts, said pivotal means being swingable into an inoperative position adjacent the plane of the frame, and resilient means for preventing the permanent longitudinal displacement of said automobile relative to said frame incident to pivotal movements of said pivotally connected means when the automobile is supported thereby.

7. In a loading device, a frame adapted to support an automobile, means for moving the frame from a position adjacent the floor to a fixed predetermined decking position with the automobile thereon, and a jack mechanism permanently secured to the frame and adapted to engage and elevate one end of the automobile with respect to the frame.

8. In a loading device, a frame adapted to support an automobile, means for supporting and moving the frame from a position adjacent the floor to a fixed predetermined inclined decking position with the automobile thereon, and jack mechanism permanently secured to the lower end of the frame and adapted to engage and elevate the adjacent end of the automobile with respect to the frame.

9. In a loading device, a frame adapted to support an automobile, jack means pivoted to the frame on an axis transverse to the automobile and adapted to engage a non-rotatable portion of the automobile adjacent one end thereof and elevate that end of the automobile with respect to the frame, and resilient means for preventing permanent longitudinal displacement of said automobile relative to said frame incident to pivotal movements of said jack means.

10. In a loading device, a frame adapted to support an automobile, means for supporting and moving the frame from a position adjacent the floor to a fixed predetermined decking position, jack means pivoted to the frame on an axis transverse to the automobile and adapted to engage a non-rotatable portion of the automobile adjacent one end thereof and elevate that end of the automobile with respect to the frame, and resilient means for preventing permanent longitudinal displacement of said automobile relative to said frame incident to pivotal movements of said jack means.

11. In a loading device, a frame adapted to support an automobile, means for supporting and